United States Patent
Church

(10) Patent No.: US 9,422,431 B2
(45) Date of Patent: *Aug. 23, 2016

(54) PROCESS AND COMPOSITION FOR TREATING METAL SURFACES USING TRIVALENT CHROMIUM COMPOUNDS

(71) Applicant: Bulk Chemicals, Inc., Reading, PA (US)

(72) Inventor: Richard J. Church, Myerstown, PA (US)

(73) Assignee: Bulk Chemicals, Inc., Reading, PA (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/058,902

(22) Filed: Oct. 21, 2013

(65) Prior Publication Data

US 2014/0050855 A1 Feb. 20, 2014

Related U.S. Application Data

(63) Continuation of application No. 12/116,513, filed on May 7, 2008, now Pat. No. 8,591,670.

(51) Int. Cl.

| | |
|---|---|
| *C23C 22/30* | (2006.01) |
| *C09D 5/00* | (2006.01) |
| *C09D 5/08* | (2006.01) |
| *C23C 22/34* | (2006.01) |
| *C23C 22/83* | (2006.01) |
| *C23C 22/00* | (2006.01) |

(52) U.S. Cl.
CPC ........ *C09D 5/002* (2013.01); *C09D 5/08* (2013.01); *C09D 5/084* (2013.01); *C23C 22/34* (2013.01); *C23C 22/83* (2013.01); *C23C 2222/10* (2013.01); *C23C 2222/20* (2013.01)

(58) Field of Classification Search
CPC ..... C23C 2222/10; C23C 2222/20; C23C 22/34; C23C 22/30
See application file for complete search history.

(56) References Cited

U.S. PATENT DOCUMENTS

| | | | |
|---|---|---|---|
| 3,935,035 A | 1/1976 | Tanaka et al. | |
| 5,859,107 A | 1/1999 | Jones et al. | |
| 6,149,735 A | 11/2000 | Oue et al. | |
| 6,248,181 B1 | 6/2001 | Osako et al. | |
| 6,511,532 B2 | 1/2003 | Matzdorf et al. | |
| 6,521,029 B1 | 2/2003 | Matzdorf et al. | |
| 6,527,841 B2 | 3/2003 | Matzdorf et al. | |
| 6,663,700 B1 | 12/2003 | Matzdorf et al. | |
| 6,669,764 B1 | 12/2003 | Matzdorf et al. | |
| 2006/0237098 A1 | 10/2006 | Matzdorf et al. | |
| 2007/0095436 A1 | 5/2007 | Matzdorf et al. | |
| 2007/0095437 A1 | 5/2007 | Matzdorf et al. | |
| 2007/0099022 A1 | 5/2007 | Matzdorf et al. | |
| 2007/0243397 A1 | 10/2007 | Ludwig et al. | |
| 2009/0032145 A1 | 2/2009 | Diaddario et al. | |

FOREIGN PATENT DOCUMENTS

| | | |
|---|---|---|
| CN | 1167510 A | 12/1997 |
| EP | 0 153 973 A1 | 9/1985 |
| EP | 1 992 718 A1 | 11/2008 |
| JP | 2002-332575 A | 11/2002 |
| WO | WO 96/17109 | 6/1996 |
| WO | WO-2006/088521 A2 | 8/2006 |
| WO | WO-2006/088521 A3 | 8/2006 |
| WO | WO-2007/102557 A1 | 9/2007 |

OTHER PUBLICATIONS

Duan Changqiang et al., "Handbook of Modern Chemistry Reagents," the first section, General Reagents, Chemical Industry Press, Aug. 1988, First Edition, p. 108.
Text of the First Office Action for Chinese Patent Application No. 200980126616.0 dated Apr. 6, 2012.

*Primary Examiner* — Lois Zheng
(74) *Attorney, Agent, or Firm* — Stradley Ronon Stevens & Young, LLP

(57) ABSTRACT

An acidic, aqueous composition contains a trivalent chromium compound, an organo-functional silane, and a compound of a group IV-B element. The composition protects metal surfaces, preferably aluminum and aluminum alloys, against corrosion and improves their paint adhesion. The trivalent chromium compound may comprise chromium fluoride and optionally others, such as chromium nitrate. The organo-functional silane is preferably an aminopropyltriethoxy silane, and the compound of a group IV-B element is preferably fluorozirconic acid. The composition can either be dried-in-place or rinsed before a further coating layer is applied. The composition may also include at least one polymer having a plurality of both carboxylic functional groups, alone or with hydroxyl groups. A process uses the aqueous composition either with or without the organo-functional silane along with a sealing step following the application of the aqueous composition; the sealing step involves applying a sealing composition, including an organo-functional silane, to the metal surface.

32 Claims, No Drawings

PROCESS AND COMPOSITION FOR TREATING METAL SURFACES USING TRIVALENT CHROMIUM COMPOUNDS

CROSS REFERENCE TO RELATED APPLICATIONS

This application is a continuation application of the U.S. Application entitled "PROCESS AND COMPOSITION FOR TREATING METAL SURFACES USING TRIVALENT CHROMIUM COMPOUNDS," filed May 7, 2008, application Ser. No. 12/116,513.

FIELD OF THE INVENTION

This invention relates to compositions and the use of such compositions for improving the corrosion resistance and paint adhesion of metal surfaces, and for maintaining low electrical contact resistance of metal surfaces. The invention is particularly well-suited to treating aluminum and aluminum alloys.

BACKGROUND OF THE INVENTION

Hexavalent chromium compounds have been used as traditional conversion coatings to treat metal surfaces to improve their corrosion resistance and paint adhesion. Hexavalent chromium shows toxicological effects and has been determined by the Environmental Protection Agency as a risk to the environment and by the Occupational Safety and Health Agency as a health risk. Moreover, chemistries based on hexavalent chromium are classified as carcinogens by these agencies.

Within the past few decades, various compositions and processes, not relying on hexavalent chromium, have been described and used for treating metal surfaces. One such example is described in U.S. Pat. No. 5,859,106 to Jones et al., which describes a composition comprising a compound of a group IV-B element and a polymer system having multiple carboxylic and hydroxyl groups.

It is highly desirable to provide coatings and processes which are free of hexavalent chromium, but still capable of improving paint adhesion and corrosion resistance of metal surfaces, such as aluminum, which are comparable to conventional hexavalent chromium-based coatings. Additionally, there is a need to provide protective coatings having excellent corrosion resistance with lowered resistivities and adequate coating weights.

SUMMARY OF THE INVENTION

The present invention relates to a composition for treating a metal surface to improve paint adhesion, corrosion resistance and/or maintain low electrical contact resistance. In one embodiment, the composition comprises water, a trivalent chromium compound, an organo-functional silane, and a compound of a group IV-B element.

In another embodiment, the composition consists essentially of water, a trivalent chromium compound, an organo-functional silane, and fluorozirconic acid.

In another embodiment, the present invention is a process for treating a metal surface. The process includes the step of contacting the metal surface with a composition comprising water, a trivalent chromium compound, an organo-functional silane, and a compound of a group IV-B element.

In another embodiment, the invention is a process for treating a metal surface comprising the steps of:

cleaning the metal surface to form a cleaned metal surface;
rinsing the cleaned metal surface with water to form a rinsed metal surface; and
contacting the rinsed metal surface with a composition comprising water, a trivalent chromium compound, an organo-functional silane, and a compound of a group IV-B element.

In another embodiment, the process additionally comprises, after contacting the rinsed metal surface with the composition, again rinsing the metal surface with water and then sealing the metal surface.

In another embodiment, a process for treating a metal surface comprises contacting a metal surface with a composition comprising water, a trivalent chromium compound and a compound of a group IV-B element and sealing the metal surface by contacting the metal surface with a sealing composition comprising water and an organofunctional silane. The composition used in the contacting step may include an organofunctional silane, as well as at least one polymer having a plurality of carboxylic functional groups, either alone or in combination with a plurality of hydroxyl groups.

It is to be understood that both the foregoing general description and the following detailed description are exemplary, but are not restrictive, of the invention.

DETAILED DESCRIPTION OF THE INVENTION

The present invention is directed to compositions and processes for treating a metal surface. Compositions according to the present invention include water, a trivalent chromium compound, an organo-functional silane, and a compound of a group IV-B element. Processes according to the present invention include contacting a metal surface with a composition including water, a trivalent chromium compound, an organo-functional silane, and a compound of a group IV-B element. In another process of the invention, the composition does not include the organofunctional silane but, instead, a sealing composition comprising an organofunctional silane is applied to the metal surface after it is contacted with the initial composition.

Aqueous compositions of the present invention are used for, upon application to a metal surface after cleaning but before some final coat is applied to the metal surface, contributing to at least one of the following: (1) improving the paint adhesion of the metal surface; (2) improving the corrosion resistance of the metal surface; and (3) maintaining or reducing the resistivity of the metal surface. Compositions of the present invention include compositions which significantly improve one or two of these characteristics, even though at least one of the others is worsened to a lesser extent. The improvement could be due to the compositions alone or the compositions in combination other process steps. Such compositions are referred to herein or in the metal treatment industry as pretreatment compositions, conversion coatings or working compositions. "Resistivity" is defined as resistance per unit surface area; typical units of resistivity are microhms per square inch.

As used herein, the term "metal," used for example in the phrase "metal surface," includes a wide variety of metals such as aluminum, iron, magnesium, and alloys thereof. Preferably, compositions of the present invention are used to treat aluminum (i.e., elemental aluminum) and aluminum alloys. The term "aluminum alloys" is a metal in which aluminum has the highest content of every other element or a content equal to the highest content of every other element.

As used herein, the term "treating" shall mean applying a pretreatment, or cleaning, rinsing, applying a pretreatment, and sealing, and optionally can include process steps after pretreatment up through and including painting. After sealing, a step of applying a decorative coating, such as painting, may be employed. Each of these steps—cleaning, rinsing, pretreating, sealing, and painting—all play a role in a final product's ability to resist corrosion and minimize paint loss, as is well-known in the art. As mentioned above, by being treated with a pretreatment composition of the present invention, a metal surface has one or more of: (1) improved paint adhesion; (2) improved corrosion resistance; and (3) equal or reduced resistivity.

As used herein, the term "trivalent chromium compound" means compounds, namely salts, of chromium in which the chromium has a valence of plus 3. No hexavalent chromium (or at worst a de minimus, inconsequential amount of it) is present in such compounds. A wide range of anions could be used, and more than one trivalent chromium compound could be used. Preferably, the chromium compound is chromium fluoride. Chromium nitrate may also be used either along with chromium fluoride or as the sole trivalent chromium compound. The preferred chromium compounds are added to the solution in the form of chromium fluoride tetrahydrate and chromium nitrate nonahydrate.

As used herein, the term "organo-functional silane" means a compound having: (1) a silane radical (e.g., silyl ($-SiH_3$), disilanyl ($-Si_2H_5$), etc.); (2) an organic group (such as an alkyl, an aryl or an alkoxy group); and (3) a functional group. Such functional groups include, but are not limited to, amino, epoxy, vinyl, and mercapto groups. Without being bound to any theory, it is believed that the organo-functional silane serves to bond with, or assist in bonding among, either the other constituents in the pretreatment composition or the constituents of other compositions or the metal surface itself or some combination thereof. Exemplary organo-functional silanes which can be used in connection with the present invention include aminopropyltriethoxy silanes, mercapto silanes, and epoxy silanes. Among a variety of silane compounds which will function within the scope of this invention are aminopropyltriethoxy silane sold under various trade names, including AMEO and Silwet A-1100, and epoxy functional silane, sold under the trade name of Hydrosil 2759. Preferably, the organo-functional silane is an aminopropyltriethoxy silane.

As used herein, the term "compound of a group IV-B element" is meant as either an acid or a salt of a group IV-B element, as described in U.S. Pat. No. 5,859,106 to Jones et al., incorporated herein by reference. Such acids include fluorozirconic acid ($H_2ZrF_6$), fluorotitanic acid ($H_2TiF_6$), and fluorohafnic acid ($H_2HfF_6$). Preferably, fluorozirconic acid is used. An exemplary salt of a Group IV-B element is ammonium zirconium carbonate. An ammonium zirconium carbonate solution sold by Magnesium Elektron Inc. under the trademark BACOTE 20, having a working empirical formula of $(NH_4)_2[Zr(OH)_2(CO_3)_2]+nH_2O$, may be used in connection with the present invention.

According to an embodiment of the invention, the composition additionally comprises a biostat for minimizing bacterial growth, especially to inhibit biological activity in a concentrated bath. Exemplary biostats include ammonium bifluoride and hydrogen fluoride.

According to an embodiment of the invention, the composition additionally comprises at least one polymer having a plurality of carboxylic functional groups or at least one polymer having a plurality of carboxylic functional groups and a plurality of hydroxyl groups. The at least one polymer could be a single polymer, such as a copolymer having both groups, or more than one polymer. Various polymers having both carboxylic functional groups and hydroxyl groups are described in U.S. Pat. No. 5,859,106 to Jones et al., incorporated herein by reference. It is not critical that the polymer system includes any particular degree of, or any detectable degree at all of, ester cross-linking. As used in the examples, a poly (methyl vinyl ether/maleic acid) sold under the trademark Gantrez S97-BF by ISP Technologies of Wayne, N.J. can be used as the polymer having a plurality of carboxylic functional groups, and a poly (vinyl alcohol) sold under the trademark Celvol 08-125 by Celanese Chemicals of Dallas, Tex. can be used as the polymer having a plurality of hydroxyl groups. Alternatively, a polymer blend having both a plurality of carboxylic functional groups and a plurality of hydroxyl groups along with a compound of a group IV-B element sold under the trademark E-CLPS® 2101 is commercially available from the assignee and can be used.

Additional components that are well-known in the art could be included in compositions of the present invention. For example, wetting agents, such as fluorosurfactants, may be included to improve wetting. In some cases, thickeners might also be included if an application requiring a higher viscosity is needed. Finally, if necessary, a compatible biocide, such as a 1,2-benzisothiazolin-3-one biocide sold under the trademark NIPACIDS BIT 20 by Clarion of Charlotte, N.C. or a product sold under the trademark NUOSEPT 495 by ISP Chemicals of Calvert City, Ky., can be included to inhibit biological growth in a working bath.

In an alternative embodiment, the composition of the present invention consists essentially of water, a trivalent chromium compound, an organo-functional silane, and a compound of a group IV-B element. While such a composition could include additives such as ammonium bifluoride, it excludes alkali metal compounds. By excluding alkali metal compounds, the formation of sludge of the pretreatment is minimized. In other words, it is possible to operate the pretreatment bath over a wider range of pH values, with other variables being constant, without sludging (or precipitation) occurring. If sludging occurs, reduced performance could follow if, for example, any of the solids or the alkali metals are adhered to the metal.

Appropriate concentration ranges of the various components is dependent upon their solubilities. At concentrations too low, there is insufficient amounts of the constituents to cover the metal surface and perform their functions. Above the solubility limits, the solute may begin to come out of the solution. Formulating compositions according to the invention in light of these constraints is well within the ability of the person of normal skill in the art. In an embodiment of the invention in which the trivalent chromium compound is chromium fluoride; the organo-functional silane is aminopropyltriethoxy silane; and the compound of a group IV-B element is fluorozirconic acid, the following ranges have been found to be preferred given certain other conditions: 0.01 to 0.15 wt % of chromium fluoride (as $CrF_3.4H_2O$); from 0.04 to 0.5 wt % aminopropyltriethoxy silane; and from 0.01 to 0.2 of wt % fluorozirconic acid. More preferably, the ranges are: 0.02 to 0.04 wt % of chromium fluoride; from 0.09 to 0.2 wt % aminopropyltriethoxy silane; and from 0.03 to 0.08 wt % of fluorozirconic acid. When an additional at least one polymer is used having a plurality of carboxylic functional groups and a plurality of hydroxyl groups, from 0.005 to 0.2 wt % (of non-volatiles), and more preferably, from 0.01 to 0.1 wt % of it may be used.

The compositions given above are of the working bath. It is, of course, desirable to ship the product in the form of a concentrate, namely up to a 10 to 100 fold increase in concentration of the above working bath concentrations. The upper limit of such concentrates is the solubility limit of the first constituent to meet or exceed its solubility limit.

The pH of the compositions is preferably, when the composition is used to treat an aluminum alloy, between 3.5 and 4.5, more preferably between 3.8 and 4.2, and most preferably about 4.0. The desired pH may be obtained by adding fluorozirconic acid to reduce the pH and ammonium carbonate to increase the pH to the desired value.

Compositions according to the invention may be made by mixing the ingredients in any of a number of sequences. The order of addition of the constituents is not critical. In one embodiment, fluorozirconate is added to water, then the organofunctional silane is added to that solution, and finally the chromium compound is added to that solution. This is typically done all as a concentrate, so the concentrate is diluted at the metal treatment site prior to use. When an additional at least one polymer is used having a plurality of carboxylic functional groups and a plurality of hydroxyl groups, any order can again be used. Preferably, a polymer blend having a plurality of carboxylic functional groups and a plurality of hydroxyl groups is made separately then added to the mixture containing water, a compound of a group IV-B element, an organofunctional silane, and a chromium compound, but, again, any desirable order of mixing can be employed.

In a process of the present invention, a metal surface is coated with a pretreatment composition of the present invention. In this contacting step, the composition may contact the metal surface by any number of techniques known in the art. One such method is immersion coating in which the metal is immersed in the bath of pretreatment. Other techniques known in the art including spraying, roll coating, or reverse roll coating, as well as manual application (e.g., brushing). The coating step is done for a time sufficient to achieve the desired coating weight on the metal surface, which can be determined empirically. This desired coating weight will depend on a number of factors well-known in the art. In one embodiment, the amount of coating is sufficient to leave from about 10 to 30 milligrams of the dried coating per each square foot of dried metal surface. By using a solution of higher concentration, it is possible to leave this amount of the dried coating with less residence time.

A process for treating a metal surface to improve corrosion resistance, improve paint adhesion and/or maintaining low electrical contact resistance comprises:

1) cleaning the metal surface to form a cleaned metal surface;

2) rinsing the cleaned metal surface with water to form a rinsed metal surface; and 3) contacting the rinsed metal surface with a composition comprising water, a trivalent chromium compound, an organo-functional silane, and a compound of a group IV-B element.

The cleaning step may be carried out in any manner known in the art. The types of cleaners suitable for use in the present invention will vary with a number of factors, including the metal being treated, the desired application, and the amount and type of soils on the metal surface. As such, the preferred cleaners can be determined empirically based on these factors. Preferably, a silicated, non-etching cleaner is used. An exemplary alkaline and silicated cleaning agent which can be used in connection with the present invention is Bulk Kleen® 737G cleaner, an alkaline powder cleaner sold by Bulk Chemicals, Incorporated of Reading, Pa. In general, the cleaning step may be effected by contacting the metal surface with a bath of an alkaline cleaning solution to form a cleaned metal surface. The alkaline cleaning solution may be an aqueous solution of an alkaline cleaning agent. The cleaning bath cleans the metal surface by removing oil and other contaminants from the metal surface. The cleaning bath is effective to remove the loose impurities and surface soils. Thus, the cleaning bath removes certain impurities from the surfaces of the metal surface. If the metal surface is heavily soiled, a detergent cleaner additive may be included in the cleaning step.

A metal surface which has been contacted by an alkaline cleaning solution is referred to herein as a "cleaned metal surface." It is cleaned in the sense it has been exposed to a cleaning bath. It may not be completely cleaned, however, in the sense that substantially all of the impurities have been removed such that it is ready to be exposed to a pretreatment composition. In some cases, it may be adequately cleaned, but in other cases, it should first be rinsed with water before being contacted with a pretreatment composition (i.e., substantially all of the impurities are, by that point, removed).

The rinsing step is well-known in the art, and deionized water is preferably used. The use of deionized water avoids the introduction of any deleterious ions, such as chloride ions, into the system. The rinsing step can be two-fold, with a first rinsing step done using tap water and then rinsing with deionized water.

After step 3) above, the metal surface may be rinsed with water once again, as is well known in the art. The rinsed metal surface can then be sealed. Any chemical sealing composition well-known in the industry can be used. In a preferred embodiment, the pretreatment composition does not contain an organofunctional silane (but instead includes just a composition comprising water, a trivalent chromium compound and a compound of a group IV-B element), and the sealing composition comprises water and an organofunctional silane. When a sealing composition is used, an intervening rinsing step is preferably applied. In a preferred embodiment using the sealing step, the pretreatment also includes an organofunctional silane as well as at least one polymer having a plurality of carboxylic functional groups and a plurality of hydroxyl groups.

After the sealing step, the metal surface may be dried, or rinsed and dried, and then a decorative coating may be applied to it. For example, the metal surface may be painted or lacquered, or first primed then painted. Such steps, priming and painting, are known in the art as "finishing steps," and any known and suitable finishing steps may be used. Suitable paints include acrylic paints and fluorocarbon paints, among others.

As can be inferred, after step 3) above, the metal surface can be dried and then a decorative coating (a paint layer) is applied, without an intervening rinsing step between these steps. This alternative process is known as a "dried-in-place" pretreatment. Regardless of whether the pretreatment is "dried-in-place" or there is an intermediate rinsing step, any known method of drying may be employed. The coating may dried by, for example, using an oven, forced air, etc.

Determining the times of treatments of the metal surfaces with the baths of the various steps is well-known in the art. They need only be long enough to permit a sufficient time for cleaning (in the case of the cleaning step) or reaction (in the case of the pretreatment or sealing steps). They can be very short or as long as thirty minutes and depend on the stage of treatment, the type of application (e.g., immersion, spray), the type of metal surface, and the desired coating weight, among other factors. The immersion time of a substrate into the composition solution will vary with the stage, and generally varies between approximately 1 minute up to about 10 minutes. The times for immersion are typically longer than when spray is used as the method of contact. Rinse times in general can be fairly short, e.g., 30 seconds to one minute. The specific times of treatment may vary over wide ranges and can be readily determined by one of ordinary skill in the art.

In sum, the present invention provides an environmentally friendly process for treating metal surfaces in a way which improves corrosion resistance and paint adhesion, and/or maintains low electrical resistivity.

EXAMPLES

The following examples are included to more clearly demonstrate the overall nature of the present invention. Examples 1-8 illustrate the improved results obtained by employing aqueous compositions of this invention.

Example 1

E-CLPS® 1900 pretreatment is a pretreatment composition comprising distilled water, aminopropyltriethoxy silane, and fluorozirconic acid sold by Bulk Chemicals, Incorporated of Reading, Pa. More specifically, E-CLPS® 1900 pretreatment comprises distilled water, A-1100/Dyslan Ameopure, hydrofluorozirconic acid, and Erosin Red GR. A-1100/Dyslan Ameopure is aminopropyl triethoxysilane commercially available from Sivento Incorporated of Piscataway, N.J., and Erosin Red GR is a dye commercially available from Pylam Products of Tempe, Ariz. The percent weight additions are 85.1899% distilled water, 9.57% A-1100/Dyslan Ameopure, 5.24% hydrofluorozirconic acid (at a 45% concentration), and 0.0001% Erosin Red GR.

Panels of high strength aluminum alloys 2024-T3 and 6061-T6 were used for testing the compositions. Bulk Kleen® 737G cleaner is a proprietary alkaline powder cleaner sold by Bulk Chemicals, Incorporated of Reading, Pa., and was used as a cleaner.

The 2024-T3 panels were cleaned in Bulk Kleen® 737G cleaner, 15 grams per liter, by immersing at 140° F. for 2 minutes. The panels were then rinsed with tap water at ambient conditions for 1 minute. The panels were then rinsed with deionized water at ambient conditions for 1 minute.

The panels were then immersed in the following pretreatment compositions at 95° F. for 2 minutes, the pretreatment compositions being:

1. E-CLPS® 1900 pretreatment at 5% v/v (namely 1 part of the E-CLPS® 1900 pretreatment was diluted in 19 parts of water)+1.5 grams per liter 45% fluorozirconic acid adjusted to a pH of about 4;

2. E-CLPS® 1900 pretreatment at 5% v/v+1.5 grams per liter 45% fluorozirconic acid+1 gram per liter chromium (III) fluoride tetrahydrate+0.15 grams per liter fluorozirconic acid adjusted to a pH of about 4;

3. E-CLPS® 1900 pretreatment at 5% v/v+1.5 grams per liter fluorozirconic acid+1 gram per liter chromium (III) fluoride tetrahydrate+0.15 grams per liter 45% fluorozirconic acid+0.0125 grams per liter ammonium bifluoride adjusted to a pH of about 4.

The panels were then dried by a hot air drier. The panels were tested using salt spray (fog) apparatus and treatment performed according to ASTM B117-07. The panel passes ASTM B117-07 if there is no pitting or white corrosion visible to the eye after 336 hours exposure for 2024-T3 or 168 hours for 6061-T6. Comparative Composition 1 (which did not include a trivalent chromium compound) failed the salt spray test at less than or equal to 114 hours. Compositions 2 and 3 passed the salt spray test at 336 hours.

Acceptable coating resistivities, as required by MilSpec MIL-DTL-81706B, with Amendment 1, 2 May 2006, require a maximum of 5,000 microhms psi before salt spray and a maximum of 10,000 microhms psi after salt spray. The resistivities in this application throughout were determined using a Keithley Model 2750 Multimeter/Switch System, Integra Series. Two finely-sanded copper blocks were placed on a sample plate about ¼" apart and two electrodes were pressed on the tops of the blocks with a firm and consistent pressure. The resistivities of the coating before the salt spray were 3000 microhms psi for composition 1, 4000 microhms psi for composition 2, and 3667 microhms psi for composition 3. The resistivities of the coating after the salt spray were 4000 microhms psi for composition 2, and 3667 microhms psi for composition 3.

The results show that compositions 2 and 3 show excellent corrosion resistance and low resistivities before and after salt spray testing.

Example 2

Various 2024-T3 and 6061-T6 panels were cleaned in Bulk Kleen® 737G cleaner, 15 grams per liter by immersing at 140° F. for 2 minutes. The panels were then water rinsed with tap water at ambient conditions for 1 minute. The panels were then rinsed with deionized water at ambient conditions for 1 minute.

The pretreatment composition comprised E-CLPS® 1900 pretreatment at 2% v/v+0.42 grams per liter of chromium (III) fluoride tetrahydrate+0.005 grams per liter of ammonium bifluoride+0.66 grams per liter of 45% fluorozirconic acid to a adjusted pH of about 4. The panels were then immersed in the above pretreatment composition at 110° F. for 2, 5 or 10 minutes.

The panels were then dried by a hot air drier. The 2024-T3 panels were subjected to the salt spray treatment for 336 hours as detailed above according to ASTM B117-07. The 2 minute pretreatment failed. The 5 and 10 minute pretreatments passed. The 10 minute pretreatment had small dark spots but no pitting or white corrosion.

As discussed above, acceptable coating resistivities using the above-mentioned Keithley Multimeter are less than 5,000 and 10,000 microhms psi before and after the salt spray, respectively. The resistivities of the coating before the salt spray were 2700 microhms psi for the 2 minute pretreatment, 2300 microhms psi for the 5 minute pretreatment, and 1000 microhms psi for the 10 minute pretreatment. After the salt spray testing, the resistivities of the coating were 3000 microhms psi for the 5 minute pretreatment and 6000 microhms psi for the 10 minute pretreatment.

The coating weights of the 6061-T6 panels were determined by the weigh-strip-weigh method. The coated test panel is weighed, stripped in 50% v/v nitric acid at ambient temperature for 5 minutes, rinsed, dried, and then weighed a second time. The coating weight minimum is 10 mg/ft$^2$, as specified by MilSpec MIL-DIL-81706B. The coating weights were 4.8 mg/ft$^2$ for the 2 minute pretreatment, 19.2 mg/ft$^2$ for the 5 minute pretreatment, and 14.4 mg/ft$^2$ for the 10 minute pretreatment.

The results show that the composition utilizing 5 and 10 minute pretreatments achieved excellent corrosion resistance, maintained low resistivities before and after the salt spray testing, and achieved good coating weights.

Example 3

Various 2024-T3 and 6061-T6 panels were cleaned in Bulk Kleen® 737G cleaner, 15 grams per liter by immersing at 140° F. for 2 minutes. The panels were then water rinsed with tap water at ambient conditions for 1 minute. The panels were then rinsed with deionized water at ambient conditions for 1 minute.

The pretreatment composition comprised E-CLPS® 1900 pretreatment at 3.5% v/v+0.37 grams per liter of chromium (III) fluoride tetrahydrate+0.82 grams per liter of chromium (III) nitrate nonahydrate+0.009 grams per liter of ammonium bifluoride+1.16 grams per liter of 45% fluorozirconic acid adjusted to a pH of about 4.

The panels were then immersed in the above pretreatment composition at 95 to 100° F. for 10 minutes. The panels were then dried by a hot air drier. The 2024-T3 and 6061-T6 panels were subjected to the salt spray treatment as detailed above according to ASTM B117-07. The 2024-T3 panel passed at 336 hours and the 6061-T6 passed at 168 hours.

As discussed above, using the above-mentioned Keithley Mulimeter, the coating resistivities must be less than 5,000 and 10,000 microhms psi before and after salt spray, respectively. The resistivity of the coating before the salt spray was 3000 microhms psi. After the salt spray testing, the resistivity of the coating was 1300 microhms psi.

As discussed above, the coating weight method was used requiring a minimum of 10 mg/ft$^2$, and the coating weight for the present composition was 30.3 mg/ft$^2$.

The results again verify that the composition achieved excellent corrosion resistance, maintained low resistivities before and after the salt spray testing, and achieved good coating weights.

Example 4

Various 2024-T3 and 6061-T6 panels were cleaned in Bulk Kleen® 737G cleaner, 15 grams per liter by immersing at 140° F. for 2 minutes. The panels were then water rinsed with tap water at ambient conditions for 1 minute. The panels were then rinsed with deionized water at ambient conditions for 1 minute.

The pretreatment composition comprised E-CLPS® 1900 pretreatment at 7.0% v/v+0.74 grams per liter of chromium (III) fluoride tetrahydrate+1.64 grams per liter of chromium (III) nitrate nonahydrate+0.018 grams per liter of ammonium bifluoride+2.31 grams per liter of 45% fluorozirconic acid adjusted to a pH of about 4.

The panels were then immersed in the above pretreatment composition at 95 to 100° F. for 2 minutes. The panels were then dried by a hot air drier. The 2024-T3 and 6061-T6 panels were subjected to the salt spray treatment as detailed above according to ASTM B117-07. The 2024-T3 panel passed at 336 hours and the 6061-T6 passed at 168 hours.

As discussed above, using the Keithley Copper Block Method, the coating resistivities must be less than 5,000 and 10,000 microhms psi before and after salt spray, respectively. The resistivity of the coating on the 2024 panel before the salt spray was 3000 microhms psi. After the salt spray testing, the resistivity of the coating on the 2024 panel was 2000 microhms psi.

As discussed above, the coating weight method was used requiring a minimum of 10 mg/ft$^2$, and the coating weight for the present composition on the 6061 panel was 30.3 mg/ft$^2$.

The results again verify that the composition achieved excellent corrosion resistance, maintained low resistivities before and after the salt spray testing, and achieved good coating weights.

Example 5

The 2024-T3 panels were cleaned in Bulk Kleen® 737G cleaner, 15 grams per liter by immersing at 140° F. for 5 minutes. The panels were then water rinsed with tap water at ambient conditions for 1 minute. The panels were then rinsed with deionized water at ambient conditions for 1 minute.

The panels were then immersed in the following pretreatment compositions:

1. E-CLPS® 1900 pretreatment at 2% v/v+0.42 grams per liter of chromium (III) fluoride tetrahydrate+0.005 grams per liter of ammonium bifluoride+and 0.66 grams per liter of 45% fluorozirconic acid adjusted to a pH of about 4;

2. E-CLPS® 1900 pretreatment at 3.5% v/v+0.37 grams per liter of chromium (III) fluoride tetrahydrate+0.82 grams per liter of chromium (III) nitrate monohydrate+0.009 grams per liter of ammonium bifluoride+1.16 grams per liter of 45% fluorozirconic acid adjusted to a pH of about 4;

3. 1.1 grams per liter of 45% fluorozirconic acid+0.42 grams per liter of chromium (III) fluoride tetrahydrate+0.005 grams per liter of ammonium bifluoride+ammonium carbonate adjusted to pH of about 4;

4. 3.0 grams per liter of 45% fluorozirconic acid+0.37 grams per liter of chromium (III) fluoride tetrahydrate+0.82 grams per liter of chromium (III) nitrate monohydrate+0.009 grams per liter of ammonium bifluoride+ammonium carbonate adjusted to pH of about 4.

Panels were then immersed in the above composition 1 or composition 3 at 110° F. for 5 minutes. Additional panels were immersed in the above composition 2 or composition 4 at 100° F. for 5 minutes. The panels were then dried in an oven at 100° F. for 5 minutes Some panels ("no seal") were subjected to the salt spray treatment as detailed above according to ASTM B117-07 for 336 hours. Additionally, some panels were sealed after the above steps using either a 2% v/v E-CLPS® 1900 pretreatment at a pH of about 5 or a 4% v/v E-CLPS® 1900 pretreatment at a pH of about 5.5. The sealed panels were dried in an oven at 100° F. for 5 minutes and then were subjected to the salt spray treatment.

The following results were determined using a salt spray rating system. 1 is unblemished or nearly unblemished. 2 is light mottling, streaking or discoloration. 3 is less than or equal to five dark spots and/or dark streaks where pitting cannot be felt with a fingertip. 4 is marginal where there are greater than or equal to six dark spots and/or dark streaks where pitting cannot be felt with a fingertip. 5 is a failure with pits and or white corrosion and pitting can be felt with a fingertip. These ratings do not include areas of the panel that lie within ½" of the edges and streaking originating at the edges.

| Salt Spray Results | | | |
|---|---|---|---|
| | No Seal | 2% E-CLPS ® 1900 Seal | 4% E-CLPS ® 1900 Seal |
| Composition 1 | 4 | 4 | 4 |
| Composition 2 | 1-2 | 3 | 1 |
| Composition 3 | 1 | 1 | 4 |
| Composition 4 | 1 | 1 | 1 |

The results show that the rinsed pretreatments passed the corrosion testing with compositions 3 and 4 achieving excellent results having either no seal or with the 2% E-CLPS® 1900 seal. This example appears to show that the silane is not needed for bare corrosion resistance, but other testing has shown that it is desirable to have silane somewhere in the system to achieve good paint adhesion.

Example 6

This example was conducted to determine the effect of varying the chromium (III) source as well as to consider the effect on corrosion resistance without any silane or seal and then with the silane in the pretreatment and with and without a sealing step.

In particular, various 2024-T3 aluminum alloy panels were cleaned in Bulk Kleen® 737G cleaner, 15 grams per liter by immersing at 140° F. for 5 minutes. The panels were then water rinsed with tap water at ambient conditions for 1 minute. The panels were then rinsed with deionized water at ambient conditions for 1 minute.

The panels were then immersed in the following pretreatment compositions:

TABLE 1

Conversion Coating Compositions

| | Working Composition (g/L) | | | |
|---|---|---|---|---|
| Constituent | 1 | 2 | 3 | 4 |
| 45% Hydrofluorozirconic Acid | 3.0 | 3.0 | 3.0 | 3.0 |
| Chromium (III) Fluoride Tetrahydrate | 0.4 | 0.2 | 0.2 | 0 |
| Chromium (III) Nitrate Nonahydrate | 0.8 | 1.2 | 1.4 | 1.6 |
| Ammonium Bifluoroide | 0.009 | 0.009 | 0.009 | 0.009 |

As referred to in Table 2 below, the description of "inorganics only" is as described at Table 1 above but with the pH adjusted to 4 with ammonium carbonate. In Table 2 below in which the pretreatment is described as "inorganics+silane," 3.35 g/L of aminopropyltriethoxy silane was added to the compositions in Table 1, then the pH was adjusted back to 4 with 45% hydrofluorozirconic acid.

After the cleaning steps above, in the "no seal" embodiments described in Table 2, the conversion coating was applied by immersing the panel in the composition described in this example for five minutes at 110° F. Then, the panels were rinsed in deionized water at ambient temperature for thirty seconds. The panels were then dried in an oven at 100° F. for five minutes. In the "seal" embodiment described in Table 2 below, rather than the last drying step, the panels were contacted with a sealant by immersing the panels after being rinsed with deionized water at ambient conditions for thirty seconds in a sealing composition comprising the E-CLPS® 1900 pretreatment at 2% v/v at ambient conditions for thirty seconds. Thereafter, the sealant was dried by exposing the metal alloy at 100° F. for five minutes in an oven.

The results are shown below in Table 2.

TABLE 2

Salt Spray Ratings for 2024 T3 Aluminum Panels

| | | Composition | | | |
|---|---|---|---|---|---|
| Description | Seal | 1 | 2 | 3 | 4 |
| Inorganics Only | no | 1-2 | 1-2 | 1 | 1 |
| Inorganics + Silane | no | 3 | 2 | 1-2 | 1-2 |
| Inorganics + Silane | yes | 3-4 | 2 | 1-2 | 1-2 |

Below is the rating guide:
Rating Guide
1: unblemished or nearly unblemished
2: light mottling, streaking or discoloration
3: ≤5 dark spots and/or dark streaks, cannot feel pitting with fingertip
4: marginal, ≥6 dark spots and/or streaks, cannot feel pitting with fingertip
5: failure, pits and/or white corrosion, can feel pits with fingertip
Note:
Ratings exclude areas of the panel that lie within ½" of the edges and streaking originating at the edges.

Once again, these examples show that it is possible to achieve good bare corrosion resistance without silane in the system.

Example 7

This example was conducted to determine how various compositions and processes would affect paint adhesion. The test panels in this examples were all 6061 aluminum alloy and the pretreatment process was provided by conventional spray. Table 3 below provides the various conversion coating compositions.

TABLE 3

Conversion Coating Compositions

| | Working Composition (g/L) | |
|---|---|---|
| Constituent | 1 (no silane) | 2 (with silane) |
| 45% Hydrofluorozirconic Acid | 2.14 | 3.40 |
| Chromium (III) Fluoride Tetrahydrate | 0.84 | 0.84 |
| Ammonium Bifluoride | 0.01 | 0.01 |
| Aminopropyl Triethoxysilane | 0 | 3.80 |

The remainder of the compositions was water.

Table 4 sets forth how the spray process cycles were conducted giving the various temperatures and times. All steps were done by immersion except for the cleaning step and the conversion coat step which was provided by spray and the deionized water rinse step which was spray mist. Bulk Kleen® 855 is an alkaline, silicated cleaner formulated for spray application and available from the assignee of this patent application. As can be seen, the "dry in place" process involves drying the conversion coating directly, without any intervening water rinsed up or any sealing layer step. The "rinsed" process involves just rinsing the conversion coating with deionized water and then drying the rinsed panel, with no intervening sealing step. Finally, the "rinsed with seal" step involves both rinsing the conversion coating with deionized water and applying a sealing layer to the rinsed panel, and then finally drying.

TABLE 4

Spray Process Cycles
6061 alloy extrusion panels, 3" × 12"

| | Dry in Place | Rinsed | Rinsed with Seal |
|---|---|---|---|
| Bulk Kleen ® 855: 3%, 135°, 90 sec | ✓ | ✓ | ✓ |
| DIW rinse: ambient 30 sec | ✓ | ✓ | ✓ |
| DIW rinse: ambient 30 sec | ✓ | ✓ | ✓ |
| Conversion Coat: 110°, pH = 4, 30 sec | ✓ | ✓ | ✓ |
| DIW rinse: ambient, spray mist, 10 sec | | ✓ | ✓ |
| Seal: E-CLPS ® 1900, 2% ambient, 30 sec | | | ✓ |
| Dry: hot air gun | ✓ | ✓ | ✓ |

Treated panels were spray painted with Valspar 2020, a liquid, polyester paint typically used for extrusions. Film thickness was about 1.2-1.5 mil and film hardness was approximately 2H.

Two tests were conducted to assess paint adhesion of the various compositions and processes. These tests are the impact resistance tests and the boiling water adhesion test.

Paint Adhesions Tests

As described in AAMA 2605-05

Impact Resistance
Procedure: Painted surface is impacted with a ⅝" diameter round-nosed object using sufficient force to cause an indentation on the test specimen approximately 0.10" deep. Tape (Permacel 99 or equivalent) is then applied to the impacted area and pressed down firmly to eliminate air pockets and voids. The tape is sharply pulled off at a right angle to the plane of the surface being tested. The test is performed under ambient conditions in the temperature range of 65° F. to 80° F. Front impact is when the object strikes the test surface directly, producing a concave impact area. Reverse impact is when the object strikes the test surface from behind, producing a convex impact area.
Rating: Failure is defined as any paint pick-off from the impacted area. Minute cracking is permissible.
Boiling Water Adhesion
Procedure: Painted surface is scribed with an 11×11 square grid, the parallel scribes being about 1 mm apart from each other. Each scribe penetrates the paint film to the substrate. The scribed specimen is them immersed in boiling deionized water for 20 minutes. After 20 minutes, the specimen is removed from the boiling water and wiped dry. Within 5 minutes, tape is applied to the scribed area and pulled off as described above.
Rating: Adhesion loss is reported as the percentage of the area within the grid that shows paint pick-off.
Table 5 below shows the paint adhesion test results.

TABLE 5

Paint Adhesion Test Results

| | | Impact | | Boiling Water Adhesion |
|---|---|---|---|---|
| Composition | Process | Front | Reverse | % Paint Loss |
| 1 (no silane) | rinsed | pass | fail | 10 |
| 1 (no silane) | rinsed with seal | pass | pass | 2 |
| 2 (with silane) | dry in place | pass | pass | 15-20 |
| 2 (with silane) | rinsed | pass | pass | 5 |

As can be seen, it appears that with no silane at all in the system, it is difficult to get suitable paint adhesion (see for example the first row). Moreover, if silane is in the conversion coating composition, it appears necessary to at least rinse that composition before painting or there is not very acceptable paint adhesion based on the boiling water test (see composition in the third row). The other two examples of Table 5 both work suitably well with the best one being no silane in the conversion coating composition but yet rinsing and then using a sealing layer comprising the silane.

Example 8

This example was done to determine the effect of adding a polymer having either carboxylic functional groups, hydroxyl groups, and a combination of both carboxylic and hydroxyl groups to the working composition. In particular, a poly (methyl vinyl ether/maleic acid) and a poly (vinyl alcohol) were used. In particular, a poly (methyl vinyl ether/maleic acid) sold under the trademark Gantrez S97-BF was used. In addition, a polyvinyl alcohol sold under the trademark Celvol 08125 was also used.

Table 6 below shows the various working composition. Gantrez S97-BF is a 12% aqueous composition (of non-volatiles), and Celvol 08-125 is an 8% aqueous composition (of non-volatiles) of polyvinyl alcohol.

TABLE 6

Pre-Treatment Compositions

| | Working Composition* | | | |
|---|---|---|---|---|
| Constituent | Silane Only | Silane + Carboxylate | Silane + Carboxylate + PVA | Silane + PVA |
| E-CLPS ® 1900 | 2% v/v | 2% v/v | 2% v/v | 2% v/v |
| Gantrez S97-BF | 0 | 2.3 g/L | 2.3 g/L | 0 |
| Celvol 08-125 | 0 | 0 | 1.8 g/L | 1.8 g/L |
| $CrF_3 4H_2O$ | 0.42 g/L | 0.42 g/L | 0.42 g/L | 0.42 g/L |
| 45% $H_2ZrF_6$ | 0.66 g/L | 0.66 g/L | 0.66 g/L | 0.66 g/L |

*Working pH adjusted to 4.0 as necessary with ammonium carbonate.

Table 7 below shows the immersion process cycles either "dry in place," "rinsed," or "rinsed & sealed." A similar sealant layer as in Example 7 was used. The same preliminary three steps were used as in the previous examples. Immersion was used as the basis for applying the pretreatment, which was done at 110° F. for five minutes, as indicated in Table 7.

TABLE 7

Immersion Process Cycles

| | "Dry In Place" | "Rinsed" | "Rinsed & Sealed" |
|---|---|---|---|
| Clean: Bulk Kleen ® 737G, 15 g/L, 140°, 5 min. | ✓ | ✓ | ✓ |
| Rinse: ambient, 1 min | ✓ | ✓ | ✓ |
| DIW Rinse: ambient, 1 min | ✓ | ✓ | ✓ |
| Pretreat: 110°, 5 min | ✓ | ✓ | ✓ |
| DIW Rinse: ambient, 1 min | | ✓ | ✓ |
| Seal: E-CLPS ® 1900, 2% v/v, ambient, 30 sec | | | ✓ |
| Dry: 100° F. oven, 5 min | ✓ | ✓ | ✓ |

Table 8 below shows the neutral salt spray results.

TABLE 8

Neutral Salt Spray Results
336 Hours Exposure per ASTM B117
4" × 6" 2027 - T3 Aluminum alloy Panels

| Process | Silane Only | Silane + Carboxylate | Silane + Carboxylate + PVA | Silane + PVA |
|---|---|---|---|---|
| Dry in Place | 3 | 2-3 | 1 | 4 |
| Rinse Only | 4 | 1-2 | 1-2 | 4-5 |
| Rinsed & Sealed | 4 | 1-2 | 2 | 4-5 |

Rating guide:
1 = Unblemished or nearly unblemished
2 = Light mottling, streaking or discoloration
3 = ≤5 dark spots and/or dark streaks, cannot feel pitting with fingertip
4 = ≥6 dark spots and/or streaks, cannot feel pitting with fingertip
5 = failure, pits and/or white corrosion, can feel pits with fingertip As can be seen, the addition of the carboxylate improved the corrosion resistance over silane only slightly in all three processes. On the other hand, the inclusion of the polyvinyl alcohol appeared to be detrimental to the corrosion resistance performance in all three cases. In view of the detrimental performance of PVA alone, it is surprising that the inclusion of both the carboxylate and PVA led to a significantly improved set of salt spray results data as compared to silane only.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A composition for treating a metal surface, said composition comprising water, a trivalent chromium compound, an organo-functional silane, a compound of a group IV-B element, and at least one polymer comprising a plurality of carboxylic functional groups and poly (vinyl alcohol).

2. The composition of claim 1, wherein the compound of a group IV-B element is an acid selected from the group consisting of fluorozirconic acid, fluorotitanic acid, and fluorohafnic acid.

3. The composition of claim 2, wherein the acid is fluorozirconic acid.

4. The composition of claim 1, wherein the organo-functional silane is selected from the group consisting of an aminopropyltriethoxy silane, a mercapto silane, and an epoxy silane.

5. The composition of claim 4, wherein the organo-functional silane is an aminopropyltriethoxy silane.

6. The composition of claim 1, wherein the trivalent chromium compound comprises chromium fluoride.

7. The composition of claim 6, wherein the trivalent chromium compound further comprises chromium nitrate.

8. The composition of claim 1, wherein the composition further comprises ammonium bifluoride.

9. The composition of claim 1, wherein the composition has a pH of from 3.5 to 4.5.

10. The composition of claim 1, wherein the trivalent chromium compound is chromium fluoride, the organo-functional silane is an aminopropyltriethoxy silane, and the compound of a group IV-B element is fluorozirconic acid, and the chromium fluoride is present in an amount from 0.01 to 0.15 wt % (as $CrF_3 \cdot 4H_2O$); the aminopropyltriethoxy silane is present in an amount 0.04 to 0.5 wt %; and the fluorozirconic acid is present in an amount from 0.01 to 0.2 wt %, and the composition has a pH of from 3.5 to 4.5.

11. The composition of claim 10, wherein the chromium fluoride is present in an amount from 0.02 to 0.04 wt % (as $CrF_3 \cdot 4H_2O$); the aminopropyltriethoxy silane is present in an amount from 0.09 to 0.2 wt %; and the fluorozirconic acid is present in an amount from 0.03 to 0.08 wt %, and the composition has a pH of from 3.8 to 4.2.

12. The composition of claim 1, wherein the at least one polymer comprising a plurality of carboxylic functional groups is poly (methyl vinyl ether/maleic acid).

13. A composition for treating a metal surface, said composition consisting essentially of water, at least one trivalent chromium compound, an organo-functional silane, fluorozirconic acid, and at least one polymer comprising a plurality of carboxylic functional groups and poly (vinyl alcohol).

14. A process for treating a metal surface, said process comprising the step of contacting the metal surface with the composition of claim 1.

15. The process of claim 14, wherein the compound of a group IV-B element is an acid selected from the group consisting of fluorozirconic acid, fluorotitanic acid, and fluorohafnic acid.

16. The process of claim 15, wherein the acid is fluorozirconic acid.

17. The process of claim 14, wherein the organo-functional silane is selected from the group consisting of an aminopropyltriethoxy silane, a mercapto silane, and an epoxy silane.

18. The process of claim 17, wherein the organo-functional silane is the aminopropyltriethoxy silane.

19. The process of claim 14, wherein the trivalent chromium compound comprises chromium fluoride.

20. The process of claim 19, wherein the trivalent chromium compound further comprises chromium nitrate.

21. The process of claim 14, wherein the trivalent chromium compound is chromium fluoride, the organo-functional silane is an aminopropyltriethoxy silane, and the compound of a group IV-B element is fluorozirconic acid, and the chromium fluoride is present in an amount from 0.01 to 0.15 wt % (as $CrF_3 \cdot 4H_2O$); the aminopropyltriethoxy silane is present in an amount 0.04 to 0.5 wt %; and the fluorozirconic acid is present in an amount from 0.01 to 0.2 wt %, and the composition has a pH of from 3.5 to 4.5.

22. The process of claim 21, wherein the chromium fluoride is present in an amount from 0.02 to 0.04 wt % (as $CrF_3 \cdot 4H_2O$); the aminopropyltriethoxy silane is present in an amount from 0.09 to 0.2 wt %; and the fluorozirconic acid is present in an amount from 0.03 to 0.08 wt %, and the composition has a pH of from 3.8 to 4.2.

23. The process of claim 14, wherein the metal surface is aluminum or an aluminum alloy.

24. The process of claim 14, wherein the composition further comprises ammonium bifluoride.

25. The process of claim 14, wherein the at least one polymer comprising a plurality of carboxylic functional groups is poly (methyl vinyl ether/maleic acid).

26. A process for treating a metal surface, said process comprising the steps of:
cleaning the metal surface to form a cleaned metal surface;
rinsing the cleaned metal surface with water to form a rinsed metal surface; and
contacting the rinsed metal surface with the composition of claim 1.

27. The process of claim 26 further comprising, after the contacting step:
rinsing the metal surface with water; and
then sealing the metal surface.

28. A process for treating a metal surface, said process comprising the steps of: contacting a metal surface with a composition comprising water, a trivalent chromium compound, an organo-functional silane a compound of a group IV-B element, and at least one polymer comprising a plurality of carboxylic functional groups and poly(vinyl alcohol);
sealing the metal surface by contacting the metal surface with a sealing composition comprising water and an organofunctional silane.

29. The process of claim 28 further comprising, after the contacting step and before the sealing step, rinsing the metal surface with water.

30. The process of claim 28, wherein the sealing composition further comprises a compound of a group IV-B element.

31. The process of claim 28 further comprising, after the sealing step, applying a decorative coating to the metal surface.

32. The process of claim 28, wherein the at least one polymer comprising a plurality of carboxylic functional groups is poly (methyl vinyl ether/maleic acid).

* * * * *